(12) United States Patent
Oshima et al.

(10) Patent No.: US 12,395,079 B2
(45) Date of Patent: Aug. 19, 2025

(54) POWER SUPPLY DEVICE FOR CONTROLLING VOLTAGE

(71) Applicant: HONDA MOTOR CO., LTD., Tokyo (JP)

(72) Inventors: Ryo Oshima, Wako (JP); Koichi Tsuno, Wako (JP); Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 336 days.

(21) Appl. No.: 18/124,746

(22) Filed: Mar. 22, 2023

(65) Prior Publication Data

US 2023/0223848 A1 Jul. 13, 2023

Related U.S. Application Data

(63) Continuation of application No. PCT/JP2020/039566, filed on Oct. 21, 2020.

(51) Int. Cl.
*H02M 3/156* (2006.01)
*H02M 1/00* (2006.01)

(52) U.S. Cl.
CPC ......... *H02M 3/156* (2013.01); *H02M 1/0003* (2021.05)

(58) Field of Classification Search
CPC ...... H02M 3/156; H02M 1/0003; H02M 3/04; H02M 1/0025; H02M 1/0048; H02M 7/48; H02M 1/007
See application file for complete search history.

(56) References Cited

U.S. PATENT DOCUMENTS

| | | | |
|---|---|---|---|
| 8,907,647 B2 | 12/2014 | Nakagawa | |
| 10,819,243 B2 | 10/2020 | Iida et al. | |
| 11,211,875 B2 | 12/2021 | Tsumura et al. | |
| 2010/0078993 A1 | 4/2010 | Ichikawa | |
| 2012/0069613 A1 | 3/2012 | Nakagawa | |
| 2015/0001932 A1 | 1/2015 | Inoue et al. | |
| 2019/0312519 A1 | 10/2019 | Iida et al. | |

(Continued)

FOREIGN PATENT DOCUMENTS

| | | |
|---|---|---|
| CA | 2894324 A1 | 12/2015 |
| CN | 110350789 A | 10/2019 |
| JP | 2011-229261 A | 11/2011 |

(Continued)

OTHER PUBLICATIONS

International Search Report for PCT/JP2020/039566 mailed Dec. 15, 2020 with partial English Translation.

(Continued)

*Primary Examiner* — Kyle J Moody
(74) *Attorney, Agent, or Firm* — Thomas Horstemeyer, LLP

(57) ABSTRACT

A method includes calculating power consumption of a DC-DC converter, controlling the DC-DC converter so that an output direct current voltage output from the DC-DC converter becomes higher than a target voltage preset in the DC-DC converter when a power consumption is less than first power, and controlling the DC-DC converter so that the output direct current voltage output from the DC-DC converter becomes lower than the target voltage when the power consumption exceeds second power greater than the first power.

9 Claims, 4 Drawing Sheets

(56) References Cited

U.S. PATENT DOCUMENTS

2020/0220470 A1 7/2020 Tsumura et al.
2023/0261579 A1* 8/2023 Tsuno ................ H02M 1/0032
                                                          323/282

FOREIGN PATENT DOCUMENTS

| JP | 2013-192383 A | 9/2013 |
| JP | 2014-003746 A | 1/2014 |
| WO | 2010/143511 A1 | 12/2010 |
| WO | 2019/049299 A1 | 3/2019 |
| WO | 2022/085118 A1 | 4/2022 |

OTHER PUBLICATIONS

IPRP for PCT/JP2020/039566 mailed Apr. 5, 2021.
Chinese Office Action for Chinese Application No. 202080105380.9 mailed Feb. 5, 2025.

* cited by examiner

POWER SUPPLY DEVICE FOR CONTROLLING VOLTAGE

CROSS-REFERENCE TO RELATED APPLICATION(S)

This application is a continuation of International Patent Application No. PCT/JP2020/039566 filed on Oct. 21, 2020, the entire disclosures of which is incorporated herein by reference.

BACKGROUND OF THE INVENTION

Field of the Invention

The present disclosure relates to a power supply device for controlling a voltage.

Description of the Related Art

ADC-DC converter is a conversion circuit that converts a certain direct current (DC) input voltage into a required constant direct current output voltage (Japanese Patent Laid-Open No. 2013-192383). The required output voltage is determined by an inverter or the like connected to a subsequent stage of the DC-DC converter.

In general, the output voltage of the DC-DC converter is controlled to a constant value. In addition, the output voltage must be equal to or lower than an allowable input voltage (withstand voltage) of the inverter connected to the subsequent stage. When a load connected to the inverter rapidly decreases, the output voltage of the DC-DC converter rapidly increases. In consideration of the rapid increase in the output voltage, the output voltage of the DC-DC converter must be set lower than the withstand voltage of the inverter. On the other hand, when the load rapidly increases, the output voltage of the DC-DC converter rapidly decreases. Therefore, it is preferable that the target value of the output voltage be low as a countermeasure against the rapid increase in the output voltage, but it is preferable that the target value of the output voltage be high as a countermeasure against the rapid decrease in the output voltage. That is, the appropriate target voltage varies depending on the load.

SUMMARY OF THE INVENTION

The present disclosure provides a power supply device includes: a DC-DC converter that converts a first direct current voltage supplied from a direct current power supply to generate a second direct current voltage;
an inverter that is supplied with the second direct current voltage from the DC-DC converter and outputs an alternating current and an alternating current voltage; and
a controller that controls the DC-DC converter so that the second direct current voltage becomes a target voltage.
The controller includes power calculation unit for calculating power consumption of the DC-DC converter.
The controller is configured to:
obtain power consumption of the DC-DC converter;
control the DC-DC converter so that the second direct current voltage output from the DC-DC converter becomes higher than the target voltage when the power consumption is less than first power; and
control the DC-DC converter so that the second direct current voltage output from the DC-DC converter becomes lower than the target voltage when the power consumption exceeds second power greater than the first power.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the disclosure.

DESCRIPTION OF THE EMBODIMENTS

Figure 1:
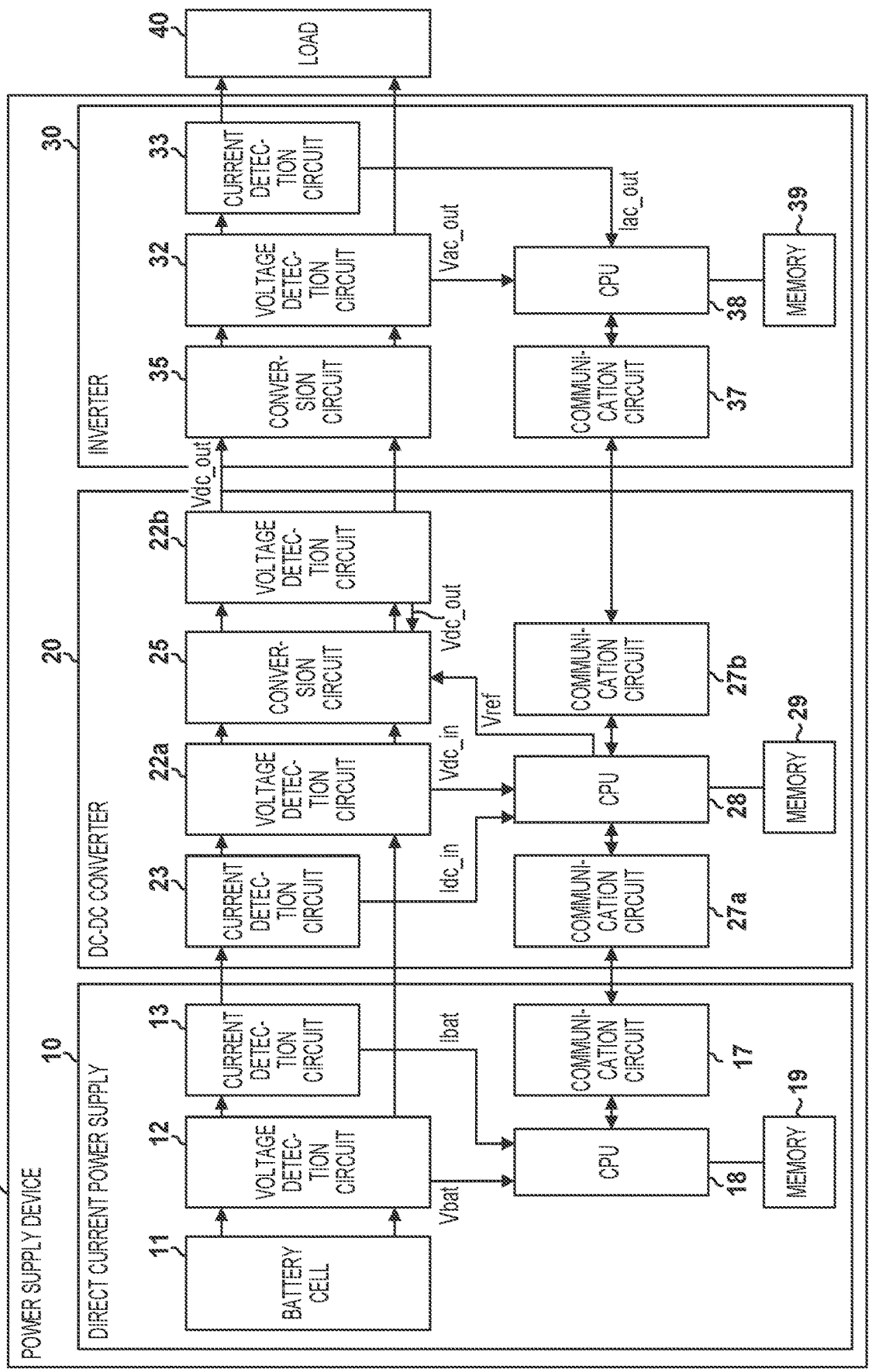
FIG. 1 is a block diagram illustrating a power supply device.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

<Power Supply Device>

FIG. 1 illustrates a power supply device 1. The power supply device 1 includes a direct current power supply 10, a DC-DC converter 20, and an inverter 30. The direct current power supply 10 is a battery, an engine-driven generator, or the like. Here, it is assumed that a battery-type direct current power supply 10 is employed. The DC-DC converter 20 converts a direct current input voltage Vdc_in supplied from the direct current power supply 10 into a direct current output voltage Vdc_out and outputs the direct current output voltage Vdc_out to the inverter 30. The inverter 30 converts the output voltage Vdc_out supplied from the DC-DC converter 20 into an alternating current output voltage Vac_out and supplies the alternating current output voltage Vac_out to a load 40.

Direct Current Power Supply

In the direct current power supply 10, a battery cell 11 outputs a battery voltage Vbat. A voltage detection circuit 12 detects the battery voltage Vbat and outputs the detection result to a CPU 18. A current detection circuit 13 detects a battery current Ibat flowing from the battery cell 11 to the DC-DC converter 20, and outputs the detection result to the CPU 18. The CPU 18 is a processor circuit that executes a control program stored in a memory 19. The CPU 18 transmits the detection result of the battery voltage Vbat and the detection result of the battery current Ibat to the DC-DC converter 20 via a communication circuit 17.

DC-DC Converter

In the DC-DC converter 20, a current detection circuit 23 is a circuit that detects an input current Idc_in from the direct current power supply 10 and outputs the detection result to an AD port of a CPU 28. The AD port is a port including an AD converter that converts an analog signal into a digital signal. The current detection circuit 23 includes, for example, a shunt resistor (resistor for current detection). A voltage detection circuit 22a is a circuit that detects an input voltage Vdc_in from the direct current power supply 10 and outputs the detection result to the CPU 28. The voltage detection circuit 22a includes, for example, a plurality of voltage dividing resistors that convert the input voltage Vdc_in into a detection voltage proportional to the input voltage Vdc_in. A conversion circuit 25 is a circuit that converts the input voltage Vdc_in into the output voltage Vdc_out. The conversion circuit 25 controls the output voltage Vdc_out to a target voltage Vtar based on a voltage command value Vref output from the CPU 28. Therefore, the voltage command value Vref is a command value indicating the target voltage Vtar. Note that the voltage command value Vref may be represented by a PWM wave (pulsed drive signal) whose pulse width is adjusted according to the target voltage Vtar. Such a drive signal is individually supplied to each of four switching elements constituting a switching circuit.

The conversion circuit 25 may be a switching converter including a switching circuit (for example, a full-bridge circuit with four field-effect transistors), a transformer, a rectifier circuit (for example, a diode bridge), a smoothing circuit (for example, an electrolytic capacitor), and the like. The CPU 28 executes various processes in accordance with a control program stored in a memory 29. For example, the CPU 28 may obtain power consumption Pin in the DC-DC converter 20 based on the detection result of the input voltage Vdc_in and the detection result of the output voltage Vdc_out, and calculate a primary correction value α of the target voltage Vtar based on the power consumption Pin. Further, the CPU 28 may calculate overall efficiency based on the detection result of the battery voltage Vbat, the detection result of the battery current Ibat, the detection result of the alternating current output voltage Vac_out transmitted from the inverter 30, and a detection result of an output alternating current Iac_out. The overall efficiency refers to the overall efficiency Ef of the direct current power supply 10, the DC-DC converter 20, and the inverter 30.

$$Ef=(Vac\_out \times Iac\_out)/(Vbat \times Ibat) \quad (1)$$

The CPU 28 determines or updates the target voltage Vtar so that the efficiency Ef is improved. The CPU 28 receives the detection result of the alternating current output voltage Vac_out and the detection result of the output alternating current Iac_out from the inverter 30 via a communication circuit 27b. A voltage detection circuit 22b detects the output voltage Vdc_out and feeds back the detection result to the conversion circuit 25. As a result, the output voltage Vdc_out is controlled to approach the target voltage Vtar corresponding to the voltage command value Vref.

The CPU 28, the memory 29, a communication circuit 27a, and the communication circuit 27b form a controller. Note that illustration of an auxiliary power supply that supplies an operating voltage to the CPU 28, the memory 29, and the communication circuits 27a and 27b is omitted. The auxiliary power supply converts the input voltage Vdc_in to generate the operating voltage. The auxiliary power supply may include, for example, a high-voltage regulator, a three-terminal regulator, an insulated power supply, and the like.

Inverter 30

In the inverter 30, a conversion circuit 35 is a circuit that converts the output voltage Vdc_out from the DC-DC converter 20 into the alternating current output voltage Vac_out. The conversion circuit 35 includes a bridge circuit formed by a plurality of switching elements. A voltage detection circuit 32 detects the output voltage Vac_out and outputs the detection result to a CPU 38. A current detection circuit 33 detects the output current Iac_out and outputs the detection result to the CPU 38. The CPU 38 controls the inverter 30 according to a control program stored in a memory 39. The CPU 38 transmits the detection result of the alternating current output voltage Vac_out and the detection result of the output alternating current Iac_out to the DC-DC converter 20 via a communication circuit 37.

[Functions of CPU]

Figure 2:
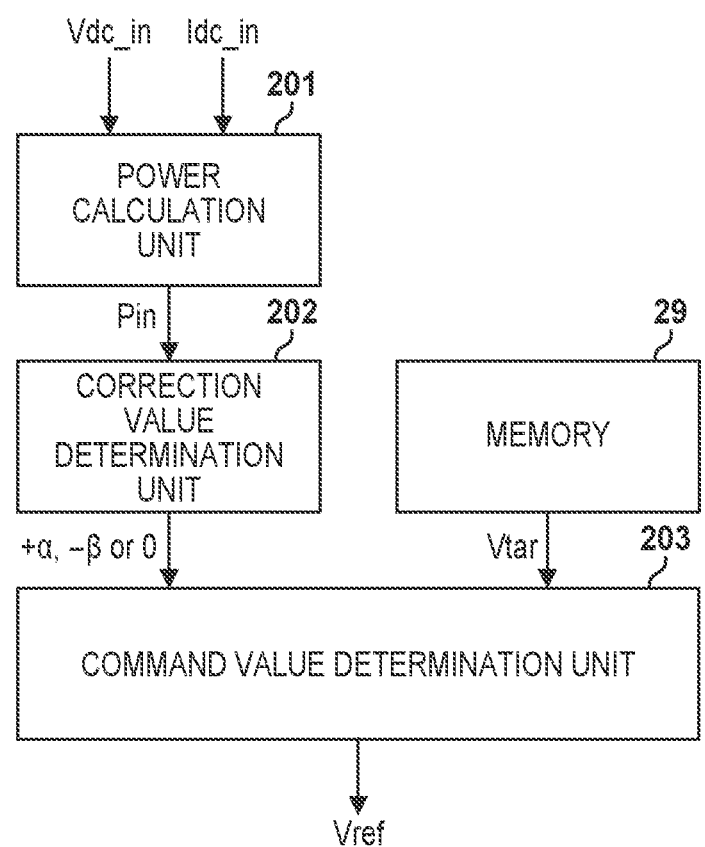
FIG. 2 is a block diagram illustrating functions implemented by a CPU.

FIG. 2 illustrates functions involved in determination of the voltage command value Vref. The CPU 28 implements the functions described below by executing the control program. Here, some or all of the functions described below may be implemented by a hardware circuit such as an application specific integrated circuit (ASIC) or a field programmable gate array (FPGA). Furthermore, the CPU 28 may include one or a plurality of processor circuits. As described above, each of the functions may be implemented by a logic circuit or a program module.

The power calculation unit 201 calculates the power consumption Pin of the DC-DC converter 20 based on the input voltage Vdc_in and the input current Idc_in. For example, the power calculation unit 201 calculates the power consumption Pin of the DC-DC converter 20 by multiplying the input voltage Vdc_in by the input current Idc_in (Pin=Vdc_in×Idc_in). The correction value determination unit 202 determines the correction value X of the target voltage Vtar according to the power consumption Pin. Here, the new target voltage Vtar may be expressed as a sum of the old target voltage Vtar' held in the memory 29 and the correction value X (Vtar=Vtar'+X).

For example, when the rated power of the power supply device 1 is 1500 W and the power consumption Pin is less than the first power P1 (for example, P1=500 W), it is expected that the load 40 will increase from now. In general, this is due to the fact that the user may use the load 40 with power consumption close to the rated power. Therefore, when the power consumption Pin is less than the first power P1, the correction value determination unit 202 determines the correction value X so that the output voltage Vdc_out becomes higher than the current target voltage Vtar by +α(X=+α). By increasing the output voltage Vdc_out in advance, the power supply device 1 can satisfactorily follow a rapid increase in the load 40. For example, when the target voltage Vtar is 180 V and α is 20 V, the output voltage Vdc_out is increased to 200 V.

On the other hand, when the power consumption Pin exceeds the second power P2 (for example, P2=1000 W), it is expected that the load 40 will rapidly decrease from now. When the load 40 rapidly decreases, the output current Idc_out of the DC-DC converter 20 rapidly decreases, and the output voltage Vac_out rapidly increases. When the output voltage Vac_out rapidly increases, the output voltage Vac_out may exceed the withstand voltage of the inverter 30. Therefore, when the power consumption Pin exceeds the second power P2, the correction value determination unit 202 determines the correction value X so that the output voltage Vdc_out becomes lower than the current target voltage Vtar by −β(X=−β). By reducing the output voltage Vdc_out in advance, the power supply device 1 can satisfactorily follow a rapid decrease in the load 40. For example, when the target voltage Vtar is 180 V and β is 15 V, the output voltage Vdc_out decreases to 165 V. By reducing the output voltage Vdc_out in this manner, a margin is secured for the withstand voltage of the inverter 30.

A command value determination unit 203 reads the target voltage Vtar from the memory 29, adds the correction value X acquired from the correction value determination unit 202 to the target voltage Vtar to obtain a sum of the target voltage Vtar plus the correction value X, determines the voltage command value Vref corresponding to the sum, and sets the voltage command value Vref in the conversion circuit 25.

Figure 3:
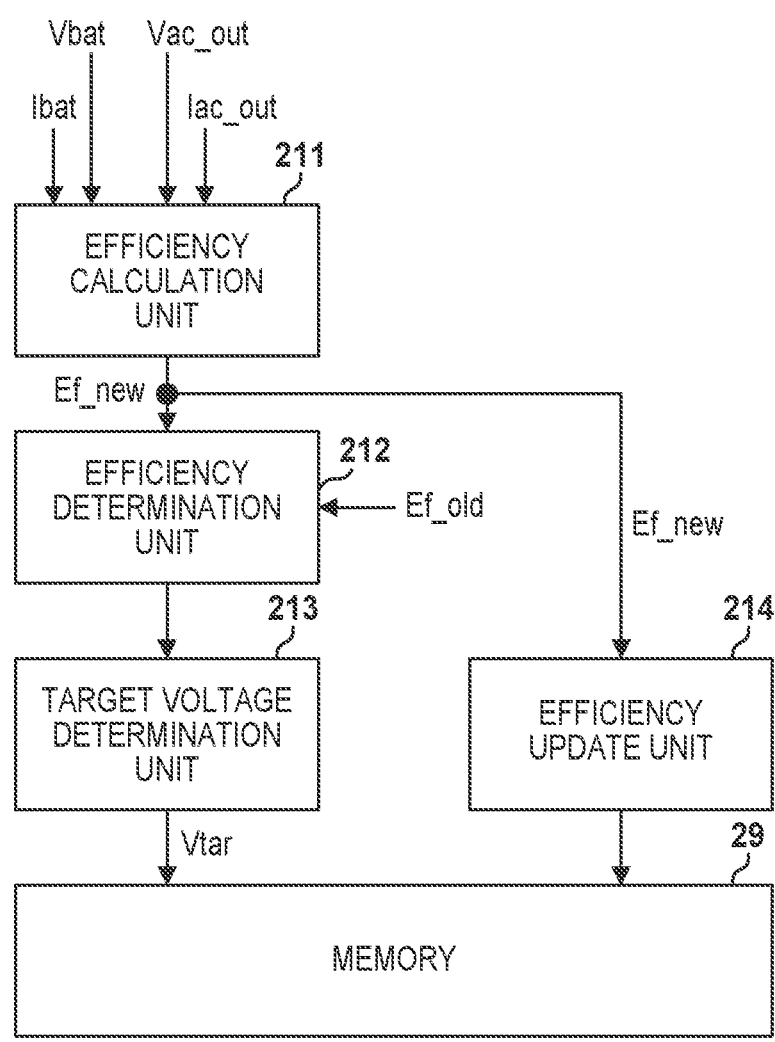
FIG. 3 is a block diagram illustrating functions implemented by the CPU.

FIG. 3 illustrates a function of improving the overall efficiency of the power supply device 1. As described above, the CPU 28 implements the functions described below by executing the control program. After the output voltage Vdc_out is corrected or adjusted according to the power consumption Pin, the CPU 28 acquires the detection result of the battery voltage Vbat and the detection result of the battery current Ibat from the direct current power supply 10, acquires the detection result of the output voltage Vac_out and the detection result of the output current Iac_out from the inverter 30, and inputs the results to an efficiency calculation unit 211. The efficiency calculation unit 211 calculates the efficiency Ef based on Equation (1). Here, the current efficiency Ef is expressed as Ef_new. The previous efficiency Ef obtained by the previous calculation and held in the memory 29 is expressed as Ef_old. An efficiency determination unit 212 determines whether the current efficiency Ef_new is equal to or higher than the previous efficiency Ef_old, and outputs the determination result to a target voltage determination unit 213.

The target voltage determination unit 213 determines a new target voltage Vtar based on the determination result. For example, when the current efficiency Ef_new is equal to or higher than the previous efficiency Ef_old, the target voltage determination unit 213 increases the target voltage Vtar. For example, the target voltage determination unit 213 adds a predetermined value Y to the target voltage Vtar and stores the addition result to the memory 29. On the other hand, when the current efficiency Ef_new is lower than the previous efficiency Ef_old, the target voltage determination unit 213 decreases the target voltage Vtar. For example, the target voltage determination unit 213 subtracts the predetermined value Y from the target voltage Vtar and stores the subtraction result to the memory 29. Thereafter, an efficiency update unit 214 updates the previous efficiency Ef_old stored in the memory 29 by overwriting the previous efficiency Ef_old with the current efficiency Ef_new.

<Flowchart>

Figure 4:
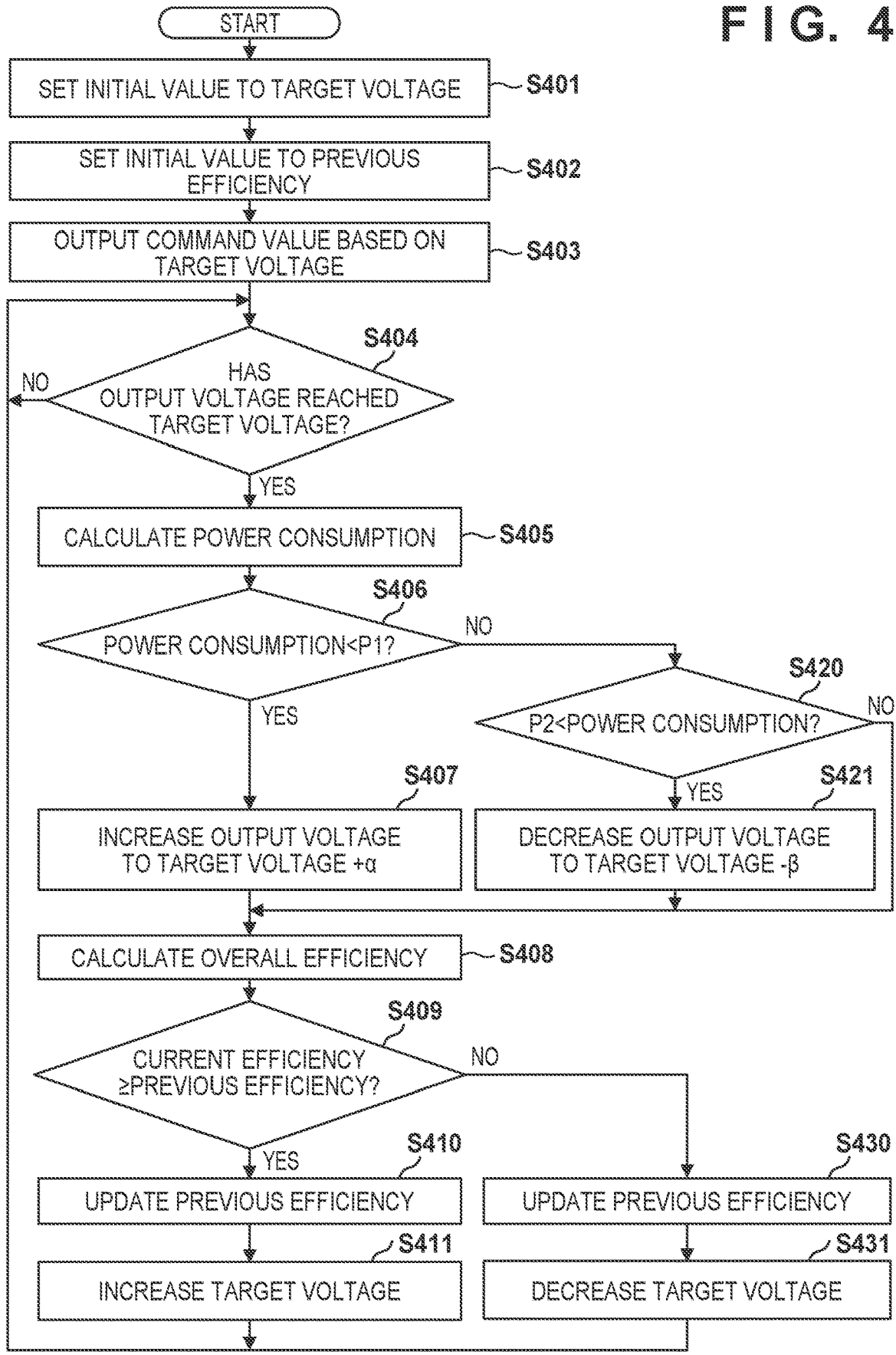
FIG. 4 is a flowchart illustrating a control method executed by the CPU.

FIG. 4 illustrates a series of processes executed by the CPU 28 according to the control program.

In step S401, the CPU 28 sets an initial value Vtar_ini to the target voltage Vtar. The initial value Vtar_ini is a value determined based on the design of the power supply device 1, and is stored in a ROM area of the memory 29. The target voltage Vtar is stored as a variable in a RAM area of the memory 29. In step S402, the CPU 28 sets an initial value Ef_ini to the previous efficiency Ef_old. The initial value Ef_ini is a value determined based on the design of the power supply device 1, and is stored in the ROM area of the memory 29. The previous efficiency Ef_old is stored as a variable in the RAM area of the memory 29.

In step S403, the CPU 28 determines the voltage command value Vref based on the target voltage Vtar read from the memory 29 and outputs the voltage command value Vref to the conversion circuit 25. As a result, the conversion circuit 25 starts voltage conversion processing. The conversion circuit 25 controls the output voltage Vdc_out so that the output voltage Vdc_out approaches the target voltage Vtar corresponding to the voltage command value Vref.

In step S404, the CPU 28 determines whether the output voltage Vdc_out has reached the target voltage Vtar based on the detection result of the output voltage Vdc_out. The detection result of the output voltage Vdc_out is a voltage (detection voltage) obtained by dividing the output voltage Vdc_out by a voltage dividing circuit. When the output voltage Vdc_out reaches the target voltage Vtar, the CPU 28 proceeds to step S405.

In step S405, the CPU 28 calculates the power consumption Pin of the DC-DC converter 20. As described above, the CPU 28 may calculate the power consumption Pin of the DC-DC converter 20 by multiplying the input voltage Vdc_in by the input current Idc_in.

In step S406, the CPU 28 determines whether the power consumption Pin is less than the predetermined value P1. That is, it is determined whether the power consumption Pin is such that a rapid increase in the output voltage Vdc_out is expected. When the power consumption Pin is less than the predetermined value P1, the CPU 28 proceeds to step S407. In step S407, the CPU 28 increases the output voltage Vdc_out to the target voltage Vtar+α by setting +α to the correction value X. On the other hand, when the power consumption Pin is not less than the predetermined value P1, the CPU 28 proceeds to step S420. In step S420, the CPU 28 determines whether the power consumption Pin exceeds the predetermined value P2 (P1<P2). That is, it is determined whether the power consumption Pin is such that a rapid decrease in the output voltage Vdc_out is expected. When the power consumption Pin exceeds the predetermined value P2, the CPU 28 proceeds to step S421. In step S421, the CPU 28 decreases the output voltage Vdc_out to the target voltage Vtar−β by setting −β to the correction value X. On the other hand, when the power consumption Pin does not exceed the predetermined value P2 (P1≤Pin≤P2), the CPU 28 sets the correction value X to 0 to maintain the output voltage Vdc_out at the target voltage Vtar.

In step S408, the CPU 28 calculates the overall efficiency Ef. Here, the current efficiency Ef_new is calculated based on the detection result of the battery voltage Vbat, the detection result of the battery current Ibat, the detection result of the alternating current output voltage Vac_out transmitted from the inverter 30, and the detection result of the output alternating current Iac_out. Equation (1) is merely an example, and a certain coefficient may be added to or multiplied by any one of the four variables included in Equation (1).

In step S409, the CPU 28 determines whether the current efficiency Ef_new is equal to or higher than the previous efficiency Ef_old. The previous efficiency Ef_old is stored in the memory 29. When the current efficiency Ef_new is equal to or higher than the previous efficiency Ef_old, the CPU 28 proceeds to step S410. In step S410, the CPU 28 updates the previous efficiency Ef_old by overwriting the previous efficiency Ef_old with the current efficiency Ef_new. In step S411, the CPU 28 increases the target voltage Vtar. For example, the CPU 28 may add the predetermined value Y to the target voltage Vtar. Thereafter, the CPU 28 returns to step S404.

On the other hand, when the current efficiency Ef_new is not equal to or higher than the previous efficiency Ef_old, the CPU 28 proceeds to step S430. In step S430, the CPU 28 updates the previous efficiency Ef_old by overwriting the previous efficiency Ef_old with the current efficiency Ef_new. In step S431, the CPU 28 decreases the target voltage Vtar. For example, the CPU 28 may subtract the predetermined value Y from the target voltage Vtar. Thereafter, the CPU 28 returns to step S404.

Summary

First Aspect

The DC-DC converter 20 is an example of a DC-DC converter that converts a first direct current voltage supplied from a direct current power supply to generate a second direct current voltage. The inverter 30 is an example of an inverter that is supplied with the second direct current voltage from the DC-DC converter and outputs an alternating current and an alternating current voltage. The CPU 28 is an example of a controller that controls the DC-DC converter so that the second direct current voltage becomes a target voltage. The CPU 28 may have power calculation unit for calculating power consumption of the DC-DC converter. When the power consumption is less than first power, the CPU 28 may control the DC-DC converter so that the second direct current voltage output from the DC-DC converter becomes higher than the target voltage. When the power consumption (for example, Pin) exceeds second power (for example, P2) greater than the first power (for example, P1), the CPU 28 may control the DC-DC converter so that the second direct current voltage output from the DC-DC converter becomes lower than the target voltage. The power consumption changes according to the load. Therefore, in the present embodiment, the target voltage is variably controlled according to the load. By controlling the output voltage according to the power consumption in this manner, the response performance of the output voltage is improved. For example, an instantaneous drop and an instantaneous rise of the direct current output voltage may be suppressed. As a result, an instantaneous fluctuation in the output voltage of the inverter is also suppressed.

Second Aspect

When the power consumption is less than the first power, the CPU 28 may control the DC-DC converter so that the second direct current voltage output from the DC-DC converter becomes equal to a sum of the target voltage (for example, Vtar) and a predetermined value (for example, α). When the power consumption exceeds the second power, the CPU 28 may control the DC-DC converter so that the second direct current voltage output from the DC-DC converter becomes equal to a difference between the target voltage and a predetermined value (for example, β). For example, when the power consumption is less than 500 W, the target voltage is set to 200 V. When the power consumption is 500 W or greater and 1000 W or less, the target voltage is set to 180 V. When the power consumption exceeds 1000 W, the target voltage is set to 165 V. These numerical values are merely examples. In addition, in general, when the load rapidly decreases, the output voltage from the DC-DC converter rapidly increases, and thus a capacitor having a high withstand voltage is required for the inverter. In the present embodiment, in a state where the output voltage can rise rapidly, the target voltage is controlled to be low in advance. Therefore, the input withstand voltage of the inverter can be reduced.

Third Aspect

The voltage detection circuit 22a functions as a voltage detection circuit that detects a first direct current voltage (for example, Vdc_in) input from the direct current power supply to the DC-DC converter. The current detection circuit 23 functions as a current detection circuit that detects an input direct current (for example, Vdc_in) input from the direct current power supply to the DC-DC converter. The power calculation unit (for example, the CPU 28) may calculate power consumption (for example, Pin) of the DC-DC converter based on the value of the first direct current voltage detected by the voltage detection circuit and the value of the input direct current detected by the current detection circuit.

Fourth and Ninth Aspects

The CPU 28 may include efficiency calculation unit (for example, the efficiency calculation unit 211) for calculating overall efficiency (for example, Ef) of the direct current power supply, the DC-DC converter, and the inverter. The CPU 28 may have setting unit (example: efficiency determination unit 212, target voltage determination unit 213) for setting the target voltage according to the efficiency. This allows the target voltage to be adjusted to improve the efficiency. In general, the target voltage is set to a fixed value, but in the present embodiment, the target voltage is variably controlled so as to improve the efficiency. This will improve the overall efficiency of the power supply device including the DC-DC converter and the inverter. In this way, when the efficiency is improved, a time period when the battery included in the direct current power supply can supply power will be increased. Alternatively, the operable time of the engine-driven generator mounted on the direct current power supply will be increased. When the efficiency is improved, a heat radiation amount of the power supply device 1 decreases, so that a cooling fan can be omitted or the cooling performance of the cooling fan can be lowered. As a result, noise reduction may be achieved.

Fifth Aspect

The CPU 28 may acquire, from the inverter, a value of the alternating current output from the inverter and a value of the alternating current voltage output from the inverter. Further, the CPU 28 may acquire, from the direct current power supply, a value of the output voltage of the direct current power supply and a value of the output current of the direct current power supply. The efficiency calculation unit 211 may be configured to calculate the efficiency based on the value of the alternating current, the value of the alternating current voltage, the value of the output voltage, and the value of the output current.

Sixth Aspect

As indicated by Equation (1), the efficiency calculation unit 211 may acquire a first product by multiplying the value of the alternating current by the value of the alternating current voltage, acquire a second product by multiplying the value of the output voltage by the value of the output current, and acquire the efficiency by dividing the first product by the second product.

Seventh Aspect

The memory 29 functions as storage unit for storing first efficiency (for example, Ef_old) obtained by the efficiency calculation unit. The CPU 28 may increase the target voltage when second efficiency (for example, Ef_new) obtained by the efficiency calculation unit after the first efficiency is obtained is higher than or equal to the first efficiency. The CPU 28 may decrease the target voltage when the second efficiency is not equal to or higher than the first efficiency. This will maintain a highly efficient operating state.

Eighth Aspect

The CPU 28 may calculate the efficiency based on the value of the alternating current, the value of the alternating current voltage, the value of the output voltage, and the value of the output current, which are acquired after the second direct current voltage is controlled based on the power consumption of the DC-DC converter.

The invention is not limited to the foregoing embodiments, and various variations/changes are possible within the spirit of the invention.

What is claimed is:

1. A power supply device comprising:
   a DC-DC converter that converts a first direct current voltage supplied from a direct current power supply to generate a second direct current voltage;
   an inverter that is supplied with the second direct current voltage from the DC-DC converter and outputs an alternating current and an alternating current voltage; and
   a controller that controls the DC-DC converter so that the second direct current voltage becomes a target voltage, wherein
   the controller is configured to:
      obtain a power consumption of the DC-DC converter;
      control the DC-DC converter so that the second direct current voltage output from the DC-DC converter becomes higher than the target voltage when the power consumption is less than a first power; and
      control the DC-DC converter so that the second direct current voltage output from the DC-DC converter becomes lower than the target voltage when the power consumption exceeds a second power greater than the first power.

2. The power supply device according to claim 1, wherein the controller is further configured to
   control the DC-DC converter so that the second direct current voltage output from the DC-DC converter becomes equal to a sum of the target voltage and a predetermined value when the power consumption is less than the first power, and
   control the DC-DC converter so that the second direct current voltage output from the DC-DC converter becomes equal to a difference between the target voltage and the predetermined value when the power consumption exceeds the second power.

3. The power supply device according to claim 2, wherein the controller is further configured to
   calculate an overall efficiency of the direct current power supply, the DC-DC converter, and the inverter, and
   set the target voltage according to the overall efficiency.

4. The power supply device according to claim 3, wherein the controller is further configured to:
   acquire, from the inverter, a value of the alternating current output from the inverter and a value of the alternating current voltage;
   acquire, from the direct current power supply, a value of an output voltage of the direct current power supply and a value of an output current; and
   calculate the overall efficiency based on the value of the alternating current, the value of the alternating current voltage, the value of the output voltage, and the value of the output current.

5. The power supply device according to claim 4, wherein the controller is further configured to:
   obtain a first product by multiplying the value of the alternating current by the value of the alternating current voltage;
   obtain a second product by multiplying the value of the output voltage by the value of the output current; and
   obtain the overall efficiency by dividing the first product by the second product.

6. The power supply device according to claim 4, further comprising:
   a storage that stores a first efficiency obtained by the controller, wherein the controller is further configured to:
      increase the target voltage when a second efficiency obtained by the controller after the first efficiency is obtained is equal to or higher than the first efficiency; and
      decrease the target voltage when the second efficiency is not equal to or higher than the first efficiency.

7. The power supply device according to claim 4, wherein the controller is further configured to calculate the overall efficiency based on the value of the alternating current, the value of the alternating current voltage, the value of the output voltage, and the value of the output current, which are acquired after the second direct current voltage is controlled based on the power consumption of the DC-DC converter.

8. The power supply device according to claim 1, further comprising:
   a voltage detection circuit that detects the first direct current voltage input from the direct current power supply to the DC-DC converter; and
   a current detection circuit that detects an input direct current input from the direct current power supply to the DC-DC converter, wherein
   the controller is further configured to calculate the power consumption of the DC-DC converter based on a value of the first direct current voltage detected by the voltage detection circuit and a value of the input direct current detected by the current detection circuit.

9. A method executed by a controller in a power supply device including a direct current power supply, a DC-DC converter, an inverter, and the controller, the method comprising:
   calculating a power consumption of the DC-DC converter;
   controlling the DC-DC converter so that an output direct current voltage output from the DC-DC converter becomes higher than a target voltage preset in the DC-DC converter when the power consumption is less than a first power; and
   controlling the DC-DC converter so that the output direct current voltage output from the DC-DC converter becomes lower than the target voltage when the power consumption exceeds a second power greater than the first power.

* * * * *